(12) United States Patent
Gibbs et al.

(10) Patent No.: US 6,693,968 B1
(45) Date of Patent: Feb. 17, 2004

(54) DIGITAL PORTABLE OR MOBILE RADIO

(75) Inventors: Jonathan Alastair Gibbs, Southampton (GB); Shaun Richard Fenton, Tadley (GB)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/492,688

(22) Filed: Jan. 27, 2000

(30) Foreign Application Priority Data

Jun. 2, 1999 (GB) ............................................. 9912761

(51) Int. Cl.$^7$ .............................. H04L 27/00; H04L 5/16
(52) U.S. Cl. ........................ 375/259; 375/220; 375/219
(58) Field of Search ................................ 375/259, 220, 375/219, 242, 243, 247, 260; 370/281, 337, 347; 455/524; 333/14; 178/66.1; 327/1

(56) References Cited

U.S. PATENT DOCUMENTS

| | | | | |
|---|---|---|---|---|
| 5,617,412 A | * | 4/1997 | Delprat et al. ............... | 370/281 |
| 5,636,243 A | * | 6/1997 | Tanaka ........................ | 375/219 |
| 5,771,463 A | * | 6/1998 | Lehmusto et al. ........... | 455/524 |
| 5,995,500 A | * | 11/1999 | Ma et al. ..................... | 370/337 |
| 6,144,656 A | * | 11/2000 | Kinnunen et al. ........... | 370/347 |

* cited by examiner

*Primary Examiner*—Stephen Chin
*Assistant Examiner*—Sam K Ahn

(57) ABSTRACT

A digital portable or mobile radio (2) includes signal transmission means (20, 22, 24), a controller (20) for periodically interrupting signal transmission by the signal transmission means during a transmit interrupt frame, and signal reception means (20, 24, 28). The controller (20) operates the signal reception means (20, 24, 28) for a first period during a transmit interrupt frame, whereby if the signal reception means detects valid return signalling during the first period, then the controller (20) extends operation of the signal reception means for a further second period, and if the signal reception means does not detect valid return signalling during the first period, then the controller (20) terminates operation of the signal reception means at the end of the first period and re-commences transmission of the digital radio signal by the signal transmission means.

5 Claims, 4 Drawing Sheets

DIGITAL PORTABLE OR MOBILE RADIO

TECHNICAL FIELD

The present invention relates to the field of radio communication systems.

BACKGROUND

Digital portable and mobile radios may be arranged either to communicate with one another via base stations, or directly with one another in 'direct mode'. The communication will typically either be over a digital simplex communication channel, or over a digital semi-duplex communication channel.

FIG. 1 illustrates the general scheme of a personal mobile radio (PMR) system 10. Portable radios 2, 4 and 6 of FIG. 1 can communicate with a base station 8. Radios 2, 4 and 6 could equally well be mobile radios mounted in vehicles. Each of the radios shown in FIG. 1 can communicate through base station 8 with one or more other radios. If radios 2, 4 and 6 are capable of direct mode operation, then they may communicate directly with one another or with other radios, without the communication link passing through base station 8.

Portable and mobile radios may employ a regular payload framing structure. This structure consists of a structure of fixed time points at which parts of the communication begin and end. Such a payload framing structure may have embedded 'transmit interrupt' frames. Transmit interrupt frames are frames during which a transmitting radio can receive a signal from another radio. These frames thus provide a mechanism for signalling to or interrupting a transmitting radio unit, for example for power control.

In order to maximise the payload data rate, the embedded transmit interrupt frames need to be kept short with respect to the overall length of the framing structure. The problem with prior art transmit interrupt arrangements is however that there are instances when lengthy return signalling can over-spill the transmit interrupt frames.

A solution to this problem would be to lengthen the transmit interrupt frames. Lengthening the duration of the transmit interrupt frames will however correspondingly reduce the amount of time for transmitting useful voice or data payload on the transmission channel.

The problem could also be solved by spreading the return signalling over several transmit interrupt frames. However, this would reduce the overall signalling efficiency and lead to slower response times.

A need exists to alleviate the problems of the prior art.

DETAILED DESCRIPTION OF THE PREFERRED EMBODIMENT

In accordance with the invention, a digital portable or mobile radio comprises: a transmitter, for transmitting a digital radio signal to at least a second portable or mobile radio; a controller for periodically interrupting signal transmission by the transmitter during a transmit interrupt frame, the controller controlling the transmitter; a receiver for receiving a signal during interruptions in the signal transmission, the receiver being controlled by the controller; the controller being adapted to operate the receiver for a first period during a transmit interrupt frame, whereby if the receiver detects valid return signalling during the first period, then the controller extends operation of the receiver for a further second period, and if the receiver does not detect valid return signalling during the first period, then the controller terminates operation of the receiver at the end of the first period and re-commences transmission of the digital radio signal by the transmitter.

Further in accordance with the invention, a transmit interrupt procedure for a digital portable or mobile radio comprises: transmitting a digital radio signal to at least a second portable or mobile radio; periodically interrupting signal transmission during a transmit interrupt frame; attempting to receive a valid return signal during interruptions in the signal transmission; the attempt to receive a valid return signal being for a first period during a transmit interrupt frame, whereby if the radio receives a valid return signal during the first period, then the signal reception is extended for a further second period, and if the radio does not receive a valid return signal during the first period, then the attempt to receive a valid return signal is terminated at the end of the first period and transmission of the digital radio signal re-commences.

The invention provides efficient use of the available signalling time on a digital communications channel. In particular, the invention provides a transmit interrupt frame of variable length, thereby optimising utilisation of the transmission times available to the radio.

Figure 1:
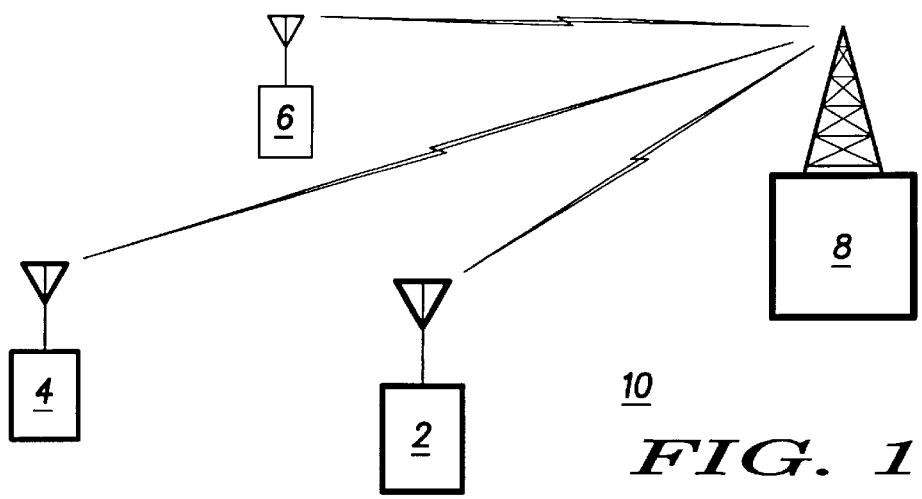
FIG. 1 illustrates an arrangement of portable and/or mobile radios and a base station.
Figure 2:
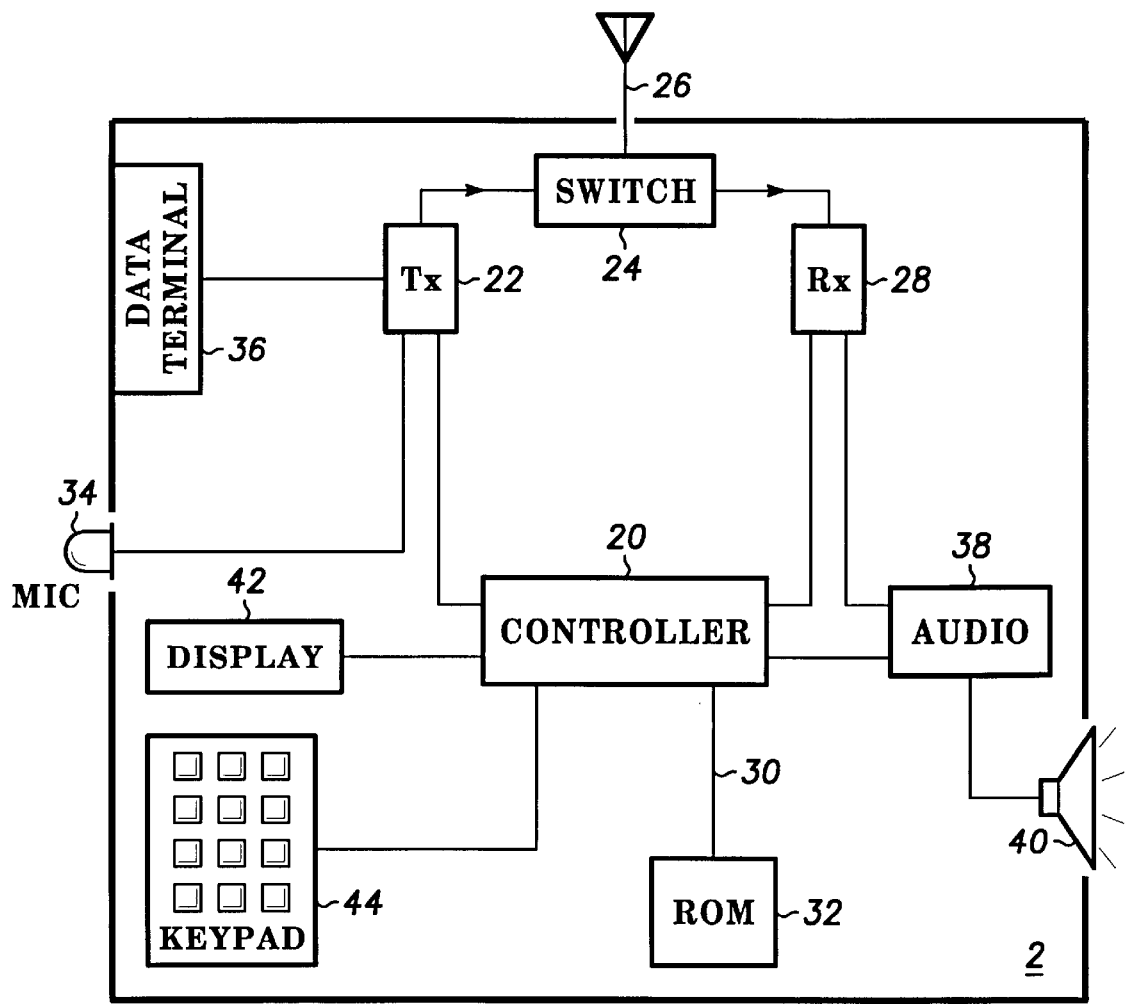
FIG. 2 illustrates a portable- or a mobile radio in accordance with the present invention.

FIG. 2 illustrates a radio in accordance with the present invention. The radio of FIG. 2 may be either a portable- or a mobile radio.

The radio 2 of FIG. 2 can transmit speech from a user of the radio. The radio comprises a microphone 34 which provides a signal for transmission by the radio. The signal from the microphone is transmitted by transmission circuit 22. Transmission circuit 22 transmits via switch 24 and antenna 26.

Radio 2 also has a controller 20 and a read only memory (ROM) 32. Controller 20 may be a microprocessor. ROM 32 is a permanent memory, and may be a non-volatile Electrically Erasable Programmable Read Only Memory (EEPROM).

The radio 2 of FIG. 2 also comprises a display 42 and keypad 44, which serve as part of the user interface circuitry of the radio. At least the keypad 44 portion of the user interface circuitry is activatable by the user. Voice activation of the radio, or other means of interaction with a user, may also be employed.

Signals received by the radio are routed by the switch to receiving circuitry 28. From there, the received signals are routed to controller 20 and audio processing circuitry 38. A loudspeaker 40 is connected to audio circuit 38. Loudspeaker 40 forms a further part of the user interface.

A data terminal 36 may be provided. Terminal 36 would provide a signal comprising data for transmission by transmitter circuit 22, switch 24 and antenna 26.

A digital portable or mobile radio in accordance with the invention comprises the following elements:

(i) Signal transmission means, for transmitting a digital radio signal to at least a second portable or mobile radio. In the embodiment of FIG. 2, elements 20, 22 and 24 constitute signal transmission means. Radio 2 may transmit to another similar radio, not shown in the figure.

(ii) A controller for periodically interrupting signal transmission by the signal transmission means during a transmit interrupt frame, the controller controlling the signal transmission means. In the embodiment of FIG. 2, controller 20 fulfils this function, periodically interrupting the signal transmission for a transmit interrupt frame.

(iii) Signal reception means for receiving a signal during interruptions in the signal transmission, the signal reception means being controlled by the controller. In the embodiment of FIG. 2, elements 20, 24 and 28 constitute signal reception means. Controller 20 controls signal reception.

In accordance with the invention, the controller is adapted to operate the signal reception means for a first period during a transmit interrupt frame. This operation is such that, if the signal reception means detects valid return signalling from another radio during the first period, then the controller extends operation of the signal reception means for a further second period. Alternatively, if the signal reception means does not detect valid return signalling during the first period, then the controller terminates operation of the signal reception means at the end of the first period and re-commences transmission of the digital signal by the signal transmission means.

Operation as described in the preceding paragraph has the following consequences:

(i) The radio will interrupt transmission for a transmit interrupt frame, and 'listen' for incoming signalling. If there is valid return signalling, then the controller causes the radio to listen for the further second period. During this time, a substantial amount of information may be received by the radio. The second period may be longer than the 'standard length' transmit interrupt frames of prior art radio arrangements.

(ii) If there is no valid return signalling, then the controller causes the radio to listen only for the first period. After this, the radio may immediately return to transmitting. The first period may be substantially shorter than the second period, thereby minimising the time for which the transmit interrupt actually interrupts transmission by the radio.

A radio in accordance with the invention therefore provides a Variable Length Transmit Interrupt. The advantages of this, taken together, provide efficient usage of a simplex or semi-duplex transmission channel. In particular, they act to tailor the amount of time for which a radio's transmission has been interrupted more closely to the amount of return signalling from another radio to the transmitting radio.

The first period may be arranged to end when either valid return signalling has been detected, or a certain time has elapsed without the detection of valid return signalling having occurred. A valid signal is one which, for example, is both destined for the radio of the invention and is of sufficient strength for that radio to be able to decode it. The first period would therefore constitute a listening window. The window would terminate either if another radio were signalling to the radio of the invention during the transmit interrupt, or after a maximum time period had elapsed within which the radio could normally have detected any valid signal.

A radio in accordance with the invention may be made compatible with the 'Digital Interchange of Information and Signalling' (DIIS) standard.

A radio in accordance with the invention may furthermore comprise one or more of the following features:

(i) Signal detection means for detecting a carrier signal during interruptions in the signal transmission, the signal detection means being controlled by the controller. In this arrangement, the radio is able to make a simple determination of whether or not there is any signal activity on the frequency at which return signalling, from another radio, would appear. This may be a precursor to a check for actual return signalling destined for the transmitting radio.

In this arrangement, the controller would be adapted to operate the signal detection means for an initial detection period during a transmit interrupt frame. If the signal detection means detects a carrier signal during the initial detection period, then the controller continues operation of the signal reception means for the first period. However, if the signal detection means does not detect a carrier signal during the initial detection period, then the controller terminates operation of the signal detection means at the end of the initial detection period and immediately re-commences transmission of the digital signal by the signal transmission means. The initial detection period may run in parallel to the first period. This might be the case, for example, if radio 2 has a circuit for detecting carrier signal which is separate from the signal reception means. However, the initial detection period may precede the first period, whereby the controller only proceeds to operate the signal reception means for the said first period if the signal detection means detects a carrier signal during the initial detection period.

The signal detection means may comprise a Received Signal Strength Indicator (RSSI). Such a detection circuit may be implemented separately from the receiving means 20, 24, 28, or may for example form part of receiving circuitry 28.

(ii) The total of the said first and second time periods may be a predetermined length of time. This would provide a known length for reception by the radio of return signalling, and thus a limited time for the whole transmit interrupt event.

(iii) The controller may be adapted to terminate operation of the signal reception means and to re-commence transmission of the digital signal by the signal transmission means when the return signalling ceases.

This feature would result in no more time being taken up for return signalling than is absolutely necessary. Taken together with feature (ii) above, any transmit interrupt to hear return signalling would be limited both to an overall maximum duration, and to a time less than this if a shorter time will accommodate the return signalling.

(iv) Part or all of the second time period may be accommodated by stealing frames from the transmitted digital signal. This will result in a normally short frame interrupt being extended as necessary, at the expense of the voice or data payload being transmitted by the radio.

FIGS. 3–11 illustrate signalling sequences which may occur with various embodiments of the invention. The left (y) axis of each of FIGS. 3–11 indicates the amount of signalling being transmitted. The right (x) axis indicates t, the time elapsed.

FIGS. 6–11 each show two traces. The upper trace is the signal transmission from the radio of the invention, the lower trace is signalling activity received or detected by the radio of the invention. The upper trace indicates voice or data transmission at the times marked 'Payload'. The upper and lower traces share the same time axis, but their signal strengths relative to one another are not as shown by the single y-axis illustrated in the figures.

Figure 3:
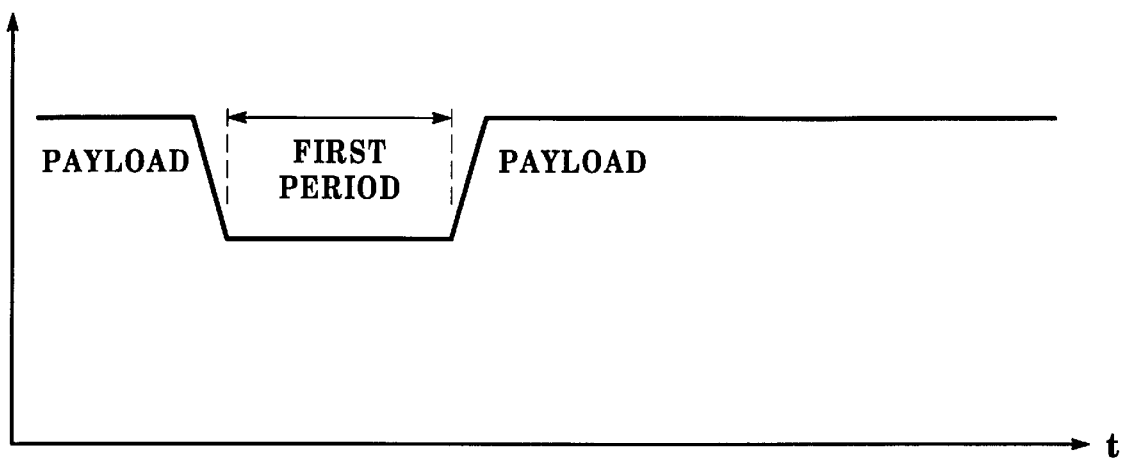
FIGS. 3–11 illustrate signalling sequences which may occur with various embodiments of the invention.
Figure 4:
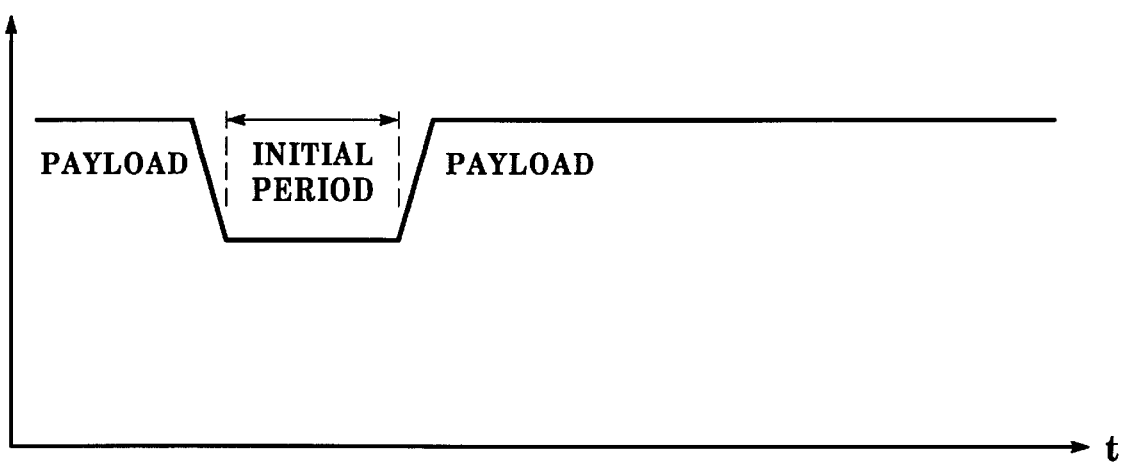
Figure 5:
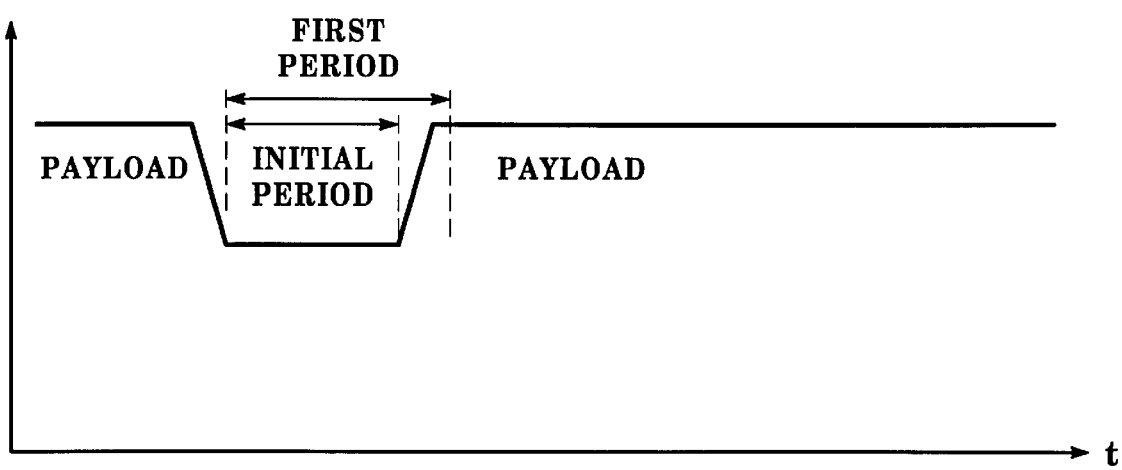

FIGS. 3–5 show the signalling sequences transmitted by various embodiments of the invention when a transmit interrupt occurs, but when there is no signalling detectable or received by the radio during the interrupt.

FIG. 3 shows a radio in accordance with the invention which listens for valid return signalling for a first time period. This is the arrangement described in appended claim 1. When no valid return signalling is received during the transmit interrupt, the radio returns to transmitting payload data.

FIG. 4 shows a radio in accordance with the invention which listens for received signal strength for an initial time period. This is the arrangement described in appended claim 2. When no received signal strength is received during the transmit interrupt, the radio returns to transmitting payload data.

FIG. 5 shows a radio in accordance with the invention which listens for received signal strength for an initial time period. The radio of FIG. 5 also attempts to detect valid return signalling, at the same time as listening for received signal strength. When no received signal strength is received during the initial period, the radio returns to transmitting payload data, without waiting for the first period to elapse.

Figure 6:
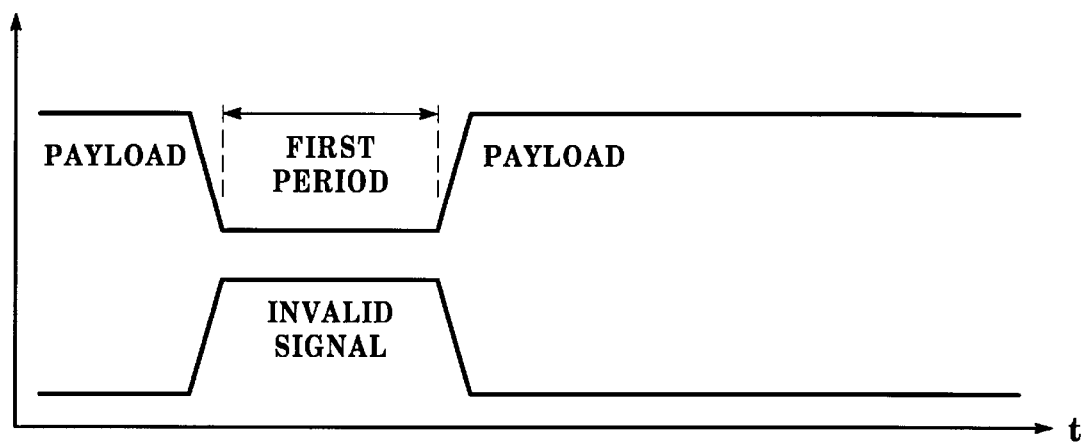
Figure 7:
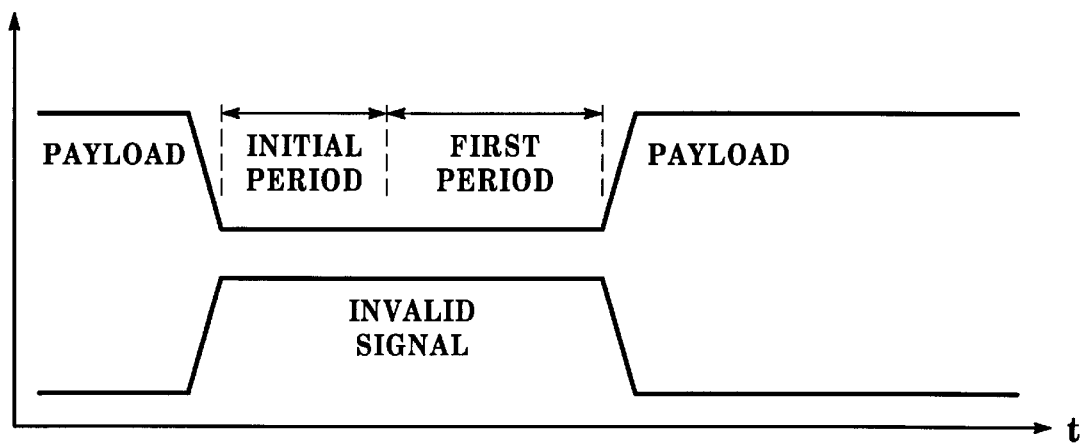
Figure 8:
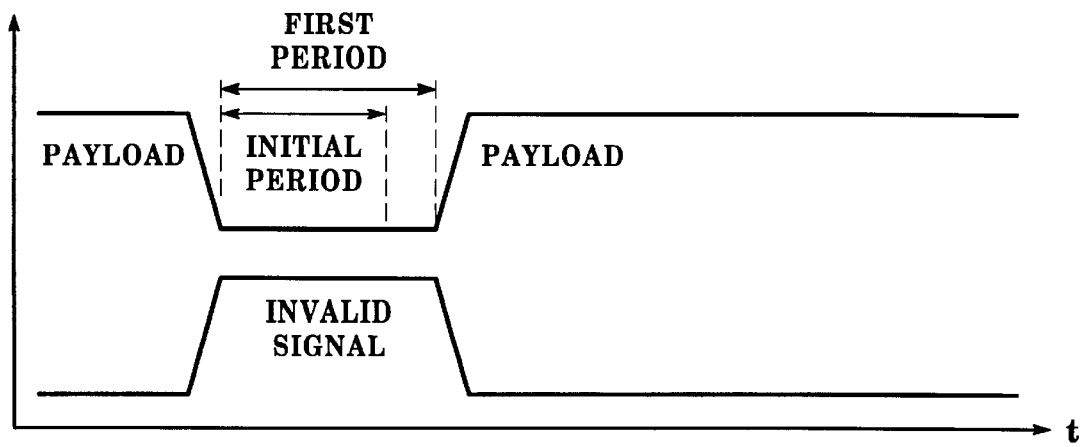

FIGS. 6–8 show the signalling sequences transmitted by various embodiments of the invention when a transmit interrupt occurs, and some signal strength is received by the radio during the interrupt. In the examples of FIGS. 6–8, this received signal does not constitute valid return signalling intended for that particular radio. The received signal strength may simply be noise, or a communication between radios not related to the radio currently in transmit interrupt mode. In the examples of FIGS. 6–8, the received signal strength is shown as starting and finishing at the same time as the start and finish of the transmit interrupt. This is for purposes of ease of understanding. The received signal strength may not start and stop at these time points, particularly if it is interference, in which case it is unlikely to be synchronised with the transmitting radio.

FIG. 6 shows a radio in accordance with the invention which listens for valid return signalling for a first time period. This is the arrangement described in appended claim 1. When no valid return signalling is received during the transmit interrupt, the radio returns to transmitting payload data.

FIG. 7 shows a radio in accordance with the invention which listens for received signal strength for an initial time period. This is the arrangement described in appended claim 2. When received signal strength is received during the transmit interrupt, the radio proceeds to listen for valid return signalling during a following first period. When no valid return signalling has been detected by the end of the first period, the radio returns to transmitting payload data. FIG. 7 shows a different length of transmit signal interrupt than FIG. 4, because of the detectable received signal strength in FIG. 7.

FIG. 8 shows a radio in accordance with the invention which listens for received signal strength for an initial time period. The radio of FIG. 8 also attempts to detect valid return signalling, at the same time as listening for received signal strength. When received signal strength is detected during the initial period, the radio continues to listen for valid return signalling during the whole of the first period. After the first period has elapsed, and no valid return signalling has been detected, the radio returns to transmitting payload data. FIG. 8 shows a different length of transmit signal interrupt than FIG. 5, because of the detectable received signal strength in FIG. 8.

Figure 9:
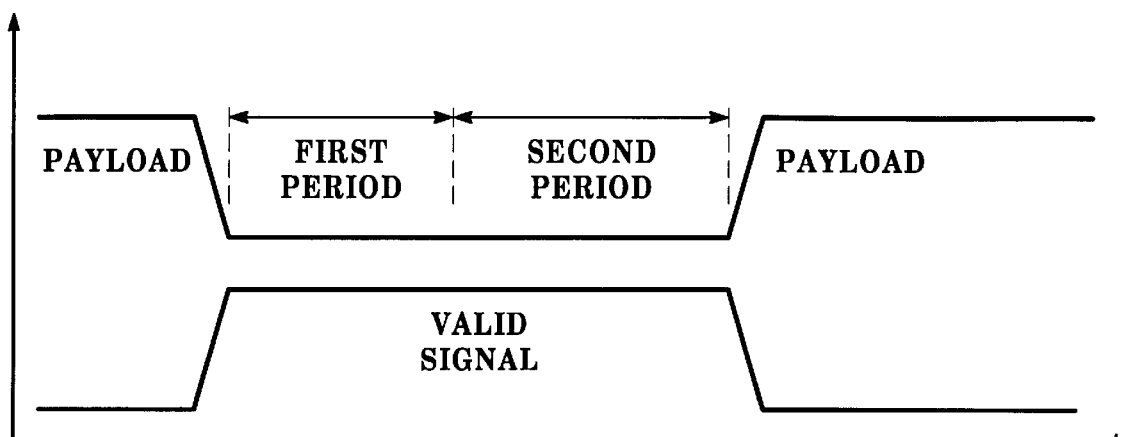
Figure 10:
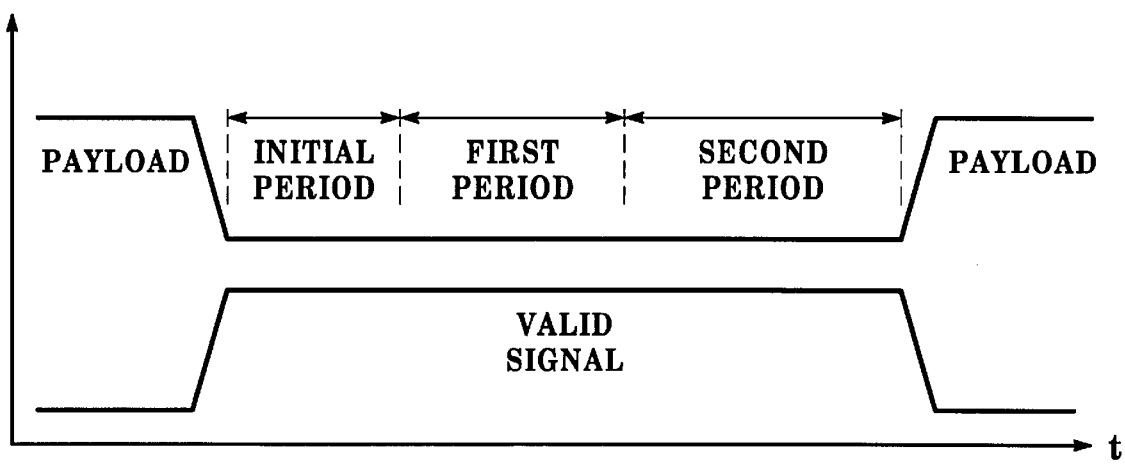
Figure 11:
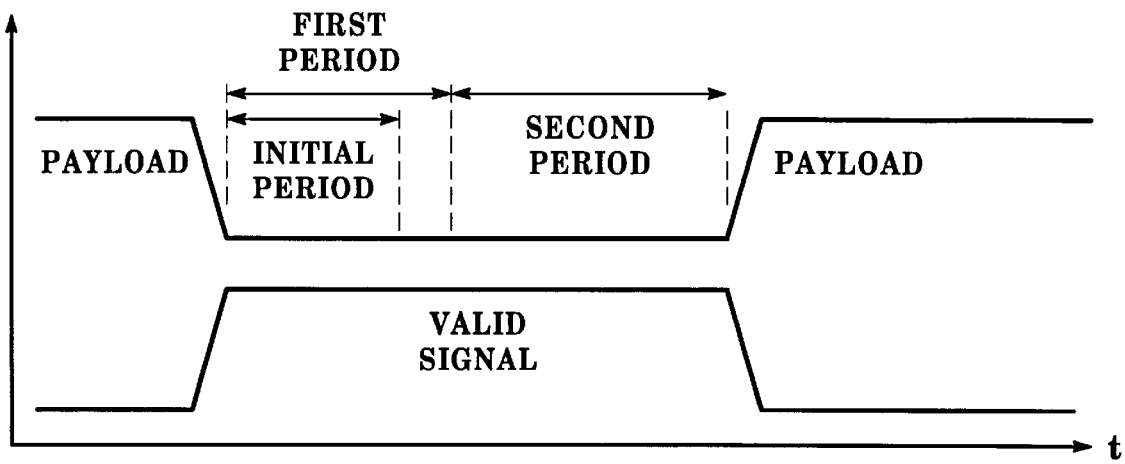

FIGS. 9–11 show the signalling sequences transmitted by various embodiments of the invention when a transmit interrupt occurs, and valid return signalling intended for that particular radio is received by the radio during the interrupt.

FIG. 9 shows a radio in accordance with the invention which listens for valid return signalling for a first time period. This is the arrangement described in appended claim 1. When valid return signalling is received during the first period, the transmit interrupt is extended by the second time period. During the whole of the second time period, the radio receives additional return signalling. At the end of the second time period, the radio returns to transmitting payload data.

FIG. 10 shows a radio in accordance with the invention which listens for received signal strength for an initial time period. This is an example of the arrangement described in appended claim 2. When received signal strength is received during the transmit interrupt, the radio proceeds to listen for valid return signalling during a following first period. When valid return signalling has been detected in this first period, the transmit interrupt is extended by the second time period. During the whole of the second time period, the radio receives additional return signalling. At the end of the second time period, the radio returns to transmitting payload data.

FIG. 11 shows a radio in accordance with the invention which listens for received signal strength for an initial time period. The radio of FIG. 11 also attempts to detect valid return signalling, at the same time as listening for received signal strength. This is another example of the arrangement described in appended claim 2. When received signal strength is detected during the initial period, the radio continues to listen for valid return signalling during the whole of the first period. After valid return signalling has been received during the first period, the transmit interrupt is extended by the second time period. During the whole of the second time period, the radio receives additional return signalling. At the end of the second time period, the radio returns to transmitting payload data.

The total duration of the transmit interrupt in FIG. 10 is greater than that in FIG. 11. However, the radio whose function is shown in FIG. 10 receives valid return signalling for longer, since it can receive data for the whole of the first time period. The radio whose function is shown in FIG. 11 may only recognise and synchronise to return signalling part way through the first time period.

The invention described above concerns a digital portable or mobile radio. The invention also encompasses a transmit interrupt procedure for a digital portable or mobile radio.

The transmit interrupt procedure comprises:
(i) transmitting a digital radio signal to at least a second portable or mobile radio;
(ii) periodically interrupting signal transmission during a transmit interrupt frame;
(iii) attempting to receive a valid return signal during interruptions in the signal transmission;
(iv) the attempt to receive a valid return signal being for a first period during a transmit interrupt frame, whereby if the radio receives a valid return signal during the first period, then the signal reception is extended for a further second period, and if the radio does not receive a valid return signal during the first period, then the attempt to receive a valid return signal is terminated at the end of the first period and transmission of the digital radio signal re-commences.

An initial detection period may also be employed during interruptions in the digital radio signal transmission, during which initial detection period an attempt is made to detect a carrier signal. The step of attempting to detect a carrier signal lasts for the initial detection period, and, if a carrier signal is detected during the initial detection period, then the attempt to receive a valid return signal is made for the first period. If however a carrier signal is not detected during the initial detection period, then the step of attempting to detect a carrier signal terminates at the end of the initial detection period and transmission of the digital radio signal re-commences.

What is claimed is:

1. A digital portable or mobile radio, comprising:
   a transmitter, for transmitting a digital radio signal transmission to at least a second portable or mobile radio;
   a controller for periodically interrupting said signal transmission by said transmitter during a transmit interrupt frame, said controller controlling operation of said transmitter;
   a receiver for receiving a signal during interruptions in said signal transmission, operation of said receiver being controlled by said controller; and
   a detector for detecting a carrier signal during interruptions in said signal transmission, operation of said detector being controlled by said controller;
   wherein said controller being adapted to operate said receiver for a first period during a transmit interrupt frame, whereby if said receiver detects valid return signalling during said first period, then said controller extends operation of said receiver for a further second period, and if said receiver does not detect valid return signalling during said first period, then said controller terminates operation of said receiver at the end of said first period and re-commences transmission of said digital radio signal by said transmitter;
   wherein said controller being adapted to operate said detector for an initial detection period during a transmit interrupt frame, whereby if said detector detects a carrier signal during an initial detection period, then said controller continues operation of said receiver for said first period, and if said detector does not detect a carrier signal during said initial detection period, then said controller terminates operation of said detector at the end of said initial detection period and re-commences transmission of said digital signal by said transmitter; and
   wherein said initial detection period precedes said first period, such that said controller only proceeds to operate said receiver for said first period if said detector detects a carrier signal during said initial detection period.

2. A digital portable or mobile radio in accordance with claim 1, wherein said detector comprises a Received Signal Strength Indicator (RSSI).

3. A digital portable or mobile radio in accordance with claim 1, wherein a total of said first and second time periods is a predetermined length of time.

4. A digital portable or mobile radio in accordance with claim 1, wherein:
   said controller is adapted to terminate operation of said receiver and to re-commence transmission of said digital signal by said transmitter when return signalling ceases.

5. A digital portable or mobile radio in accordance with claim 1, wherein:
   part or all of said second time period is accommodated by stealing frames from said transmitted digital signal.

* * * * *